United States Patent
Agarwal et al.

(10) Patent No.: US 6,317,601 B1
(45) Date of Patent: Nov. 13, 2001

(54) AUTOMATIC CODE GAPPING (ACG) FOR WIRELESS SYSTEMS

(75) Inventors: Anjana Agarwal, Wheaton; Anthony Buttitta, Schaumburg; Viraraghavan Sudarsan; Janice Marie Wunsch, both of Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/206,199

(22) Filed: Dec. 4, 1998

(51) Int. Cl.[7] ........................................ H04Q 4/20
(52) U.S. Cl. .................. 455/453; 455/422; 455/428; 455/445; 455/466
(58) Field of Search ........................ 455/560, 445, 455/453, 428, 422, 424, 458, 461, 466, 31.2, 31.3, 38.2; 379/221

(56) References Cited

U.S. PATENT DOCUMENTS

| | | | |
|---|---|---|---|
| 5,548,533 | * | 8/1996 | Gao et al. ............................. 709/235 |
| 5,570,410 | * | 10/1996 | Hooshiari ............................... 379/32 |
| 5,581,610 | * | 12/1996 | Hooshiari ............................. 379/133 |
| 5,680,442 | * | 10/1997 | Bartholomew et al. ............... 379/67 |
| 5,701,301 | * | 12/1997 | Weisser, Jr. .......................... 370/428 |
| 5,778,057 | * | 7/1998 | Atai ...................................... 379/220 |
| 5,812,639 | * | 9/1998 | Bartholomew et al. .......... 379/88.18 |
| 5,825,860 | * | 10/1998 | Moharram ............................ 379/133 |
| 5,862,334 | * | 1/1999 | Schwartz et al. .................... 379/220 |
| 5,898,672 | * | 4/1999 | Ginzboorg ........................... 370/236 |
| 5,915,013 | * | 6/1999 | Mintz et al. ......................... 379/230 |
| 6,028,914 | * | 2/2000 | Lin et al. ............................... 379/14 |
| 6,137,806 | * | 10/2000 | Martinez .............................. 370/428 |
| 6,188,905 | * | 2/2001 | Rudrapatna et al. ................ 455/452 |
| 6,243,449 | * | 6/2001 | Margulis et al. .................... 379/113 |

OTHER PUBLICATIONS

Bellcore Document GR–1298–Core & GR–1299–Core, Sections 14 and 5.3.1, respectively; Issues 3, Revisionl, Nov. 1996.

* cited by examiner

Primary Examiner—Daniel Hunter
Assistant Examiner—Yemane Woldetatios
(74) Attorney, Agent, or Firm—Werner Ulrich

(57) ABSTRACT

In a wireless telecommunications network, apparatus and method for code gapping messages from mobile switching centers to switching control points. The switching control point, (SCP), sends a stand-alone message containing only code gap control information to each of the MSCs served by the SCP. The code gap control message specifies the types of messages which are to be subject to code gap control, as well as the code gap interval and overall timer interval. The message further specifies such details as the range of digits of calls for which messages are to be subject to code gap control. Advantageously, the specification of the details of code gap control is made more efficient.

8 Claims, 3 Drawing Sheets

AUTOMATIC CODE GAPPING (ACG) FOR WIRELESS SYSTEMS

TECHNICAL FIELD

This invention relates to arrangements for communicating between switching systems and switching control points, (SCPs).

PROBLEM

The Advanced Intelligent Network, (AIN), is an arrangement of switching systems that communicate via common channel signaling arrangements, and databases known as switching control points, (SCPs), that respond to queries from the switching systems, (switches). For example, in support of local number portability for land based telephones, a query to a SCP can be used to identify the switch to which a line with a particular directory number is connected.

Extensive standards have been established for AIN networks, including standards for code gapping of messages to throttle message traffic when an SCP is overloaded. The code gapping arrangement, which is well known in the prior art, permits a SCP to signal to a switch served by that SCP to throttle its message traffic. The particular throttling signal is a suffix to one of the standard AIN messages, and specifies the type of message to be throttled, the code gapping interval, and the time over which code gapping for this type of message is to be invoked. Code gapping operates by suppressing the transmission of all messages of the particular type for an interval known as the code gapping interval, following the transmission of any such message. Any messages which were to be transmitted during the code gapping interval, are either transmitted to another SCP if that other SCP is capable of answering the particular query of the type of message, or simply abandoned, thereby abandoning the attempt to establish the call. A problem of the prior art is that the scheme for sending code gapping messages in AIN cannot be efficiently used in wireless systems. Solution:

Applicants have studied the AIN arrangement, and have identified a number of disadvantages. Every message is part of a two-way message set. The suffix previously mentioned is part of one of the messages of a two-way message set, but does not require a corresponding suffix in the other direction. However, the requirement for bi-directional call control messages effectively requires that code gapping commands be sent as suffixes of other messages.

The standards for wireless systems do not have a code gapping requirement. Unfortunately, the ANSI 41 standard, which among other things, specifies messages between mobile switching centers, (MSCs), and SCPs, does not support multi-component messages (i.e., messages with suffixes as the term is used above). Further, the AIN arrangement requires that each switch must be notified for each type of call message.

Applicants have solved these problems, and made a contribution over the prior art in accordance with this invention wherein unidirectional messages for code gapping are proposed for the ANSI 41 standard for communicating between mobile switching centers and SCPs. Advantageously, this adds the provision for code gapping, an arrangement which has been found useful in other systems to handle overload message traffic to SCPs.

In Applicants' preferred embodiment, code gapping messages are sent as uni-directional single component messages from an SCP to the MSCs supported by that SCP. Advantageously, such messages can immediately be routed to the processes for controlling code gapping; advantageously, the single component character of the messages is retained, thus simplifying the introduction of software for handling code gapping messages into present systems.

In accordance with Applicants' preferred embodiment, a code gapping message specifies one or more types of messages for which code gapping should be invoked. In one specific case, useful if the SCP is heavily overloaded, code gapping is invoked for all messages. Advantageously, this reduces the number of messages required to invoke code gapping, and reduces the interval before which code gapping is invoked.

DETAILED DESCRIPTION

Figure 1:
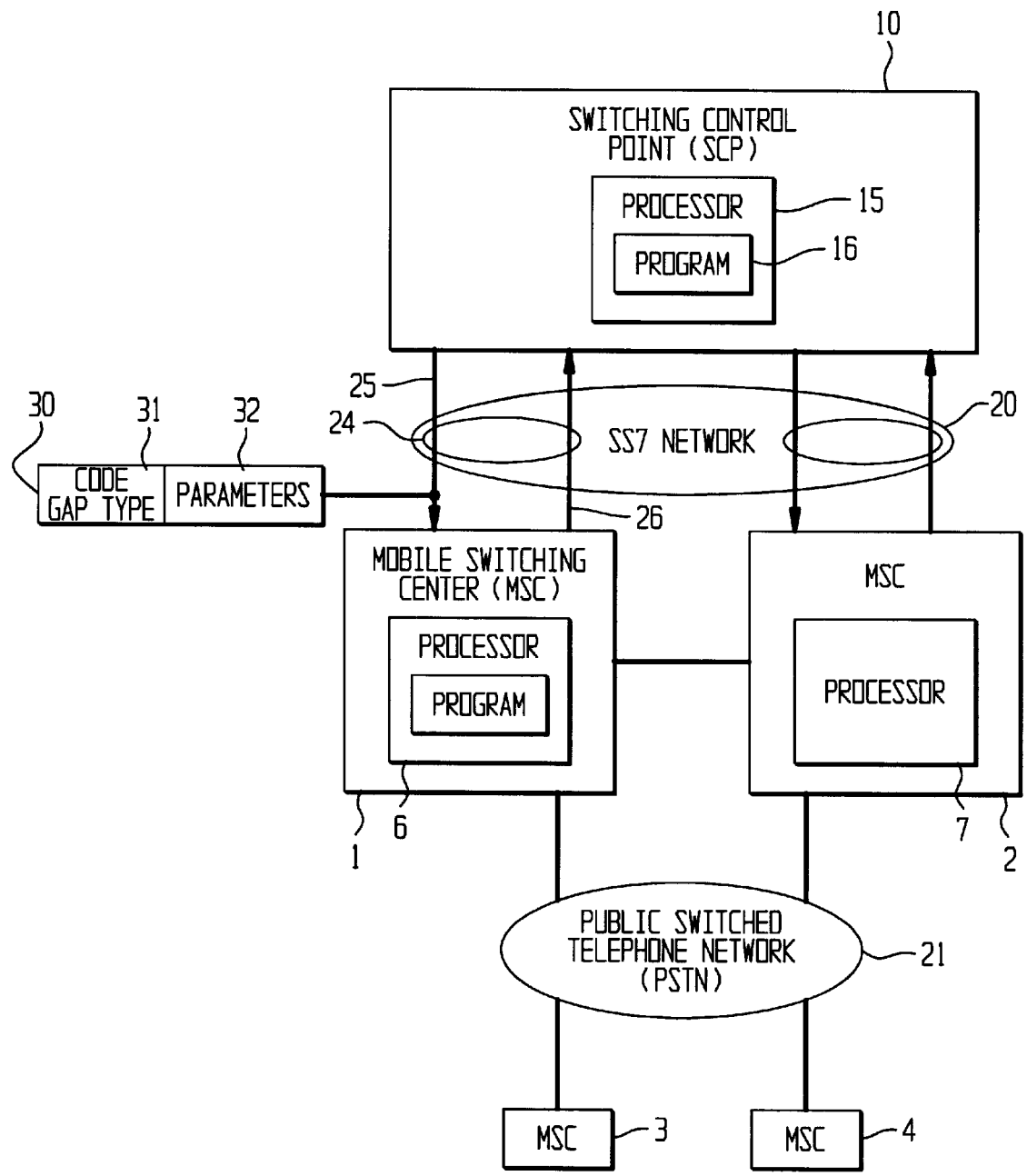
FIG. 1 is a Block Diagram illustrating the connection between mobile switching centers and the serving SCPs.

FIG. 1 is a Block Diagram illustrating Applicants' invention. Shown are four mobile switching centers, 1, 2, 3, 4, interconnected by a public switched telephone network 21. Also shown is an SCP 10, and the links between that SCP, and MSC 1 and MSC 2. The link between MSC 1 and SCP 10 is a bi-directional link 24, having a uni-directional link 25 from SCP 10 to MSC 1, and a uni-directional link 26 from MSC 1 to SCP 10. Over link 25, a code gapping control message 30 is transmitted from SCP 10 to MSC 1. The data links are connected by a common channel signaling system 7, (CCS7), network 20, which may have switching elements to switch messages from incoming links to outgoing links.

The code gap control message 30 includes an identifying type 31, and parameters 32. Among the parameters are a control type which indicates the types of messages to be subjected to the control gap throttling. If the messages are digit based, i.e., based on the dialed, or otherwise specified number of the call, the control type indicates the number of digits to be examined for possible code gapping, and the values of the digits which are to be code gapped. For example, if the SCP has recognized a situation in which there is an excessive number of calls to a particular 7-, or 10 digit number, (e.g., a call-in situation wherein callers are offered free merchandise), the specific 7-, or 10 digit number is identified. If a somewhat more general situation, such as a local earthquake, has been identified, then code gapping may be invoked for calls to a particular NPA, (Numbering Plan Area), or one or more office codes.

Another parameter is the reason for the code gapping. Two of the most common reasons are SCP overload, and a response to a service management system request, (e.g., for maintenance, or testing).

Another pair of parameters is the gap duration, (the number of seconds for which code gapping should be applied), and the gap interval (the number of milliseconds that must be allowed between successive code gapped messages of the type referred to in the code gapping control message). Each type of message has its own pair of timers.

A third parameter is the types of messages which are to be code gapped. Each type of message has it own timer.

Each MSC has an associated processor complex, (processor 6 and processor 7, for MSC 1 and MSC 2, respectively), for executing a program for controlling the MSC. Similarly, the SCP 10 has a processor 15, operative under the control of a program 16, for controlling its operations. Messages are sent between the processor of an MSC and the processor of the SCP. The flow diagrams of FIGS. 2 and 3 are executed by processors 15 and 6, respectively.

Figure 2:
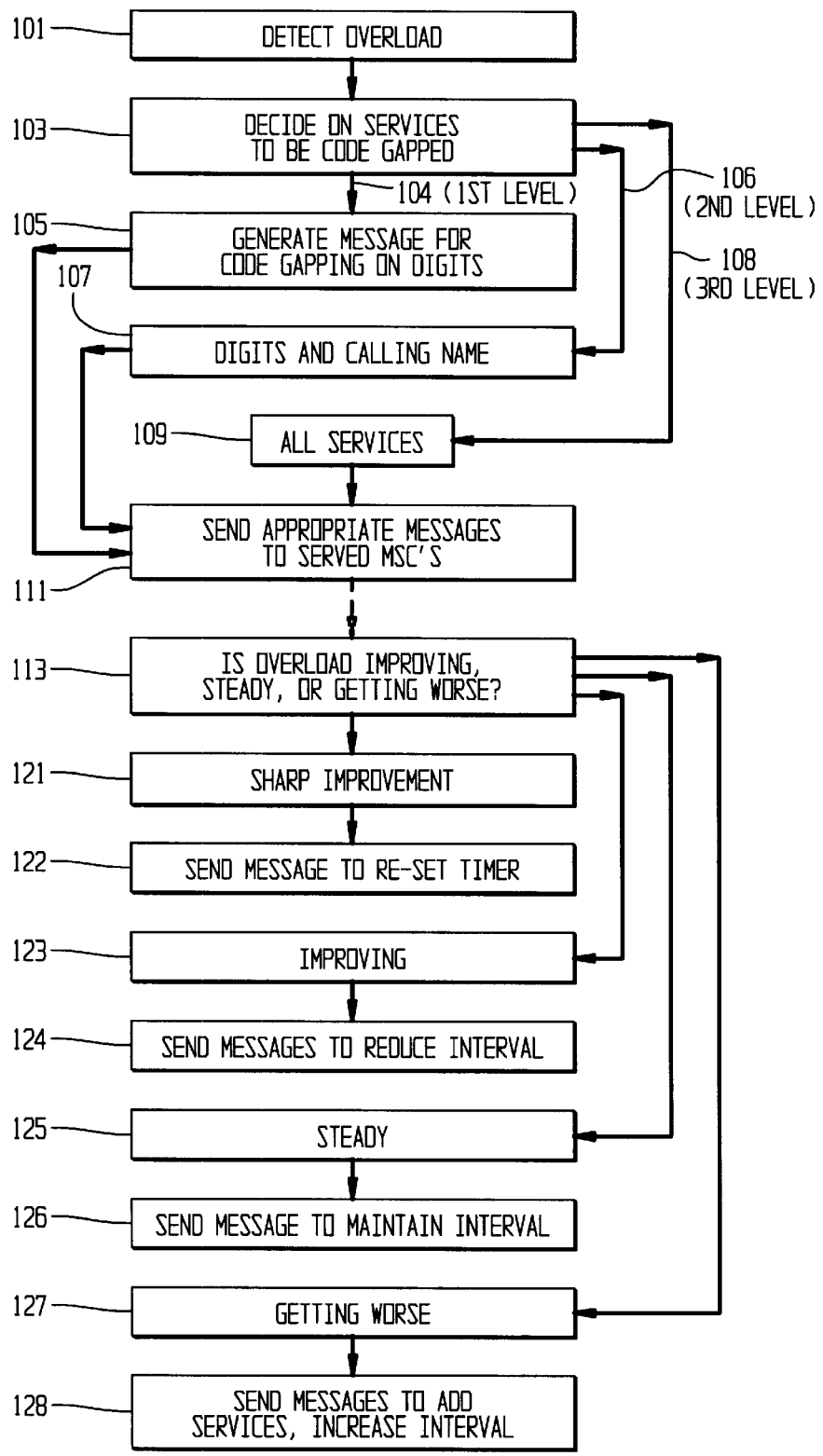
FIG. 2 is a Flow Diagram illustrating actions performed at an SCP to invoke code gapping.

FIG. 2 is a Flow Diagram of actions performed by the SCP. When overload is detected, (Action Block 101), the SCP then decides which types of services are to be code gapped, (Test 103). If the result of Test 103 is that code gapping is to be performed based only on the value on digits of the call, then an appropriate message indicating the number of digits, and range for which messages are to be code gapped is generated, (Action Block 105). Action Block 107 is used for generating a message for code gapping on digits. Finally, Action 109 is used for generating a message for code gapping for all services. Following one of Action Blocks 105, 107, or 109, an appropriate message to the served MSCs is transmitted, (Action Block 111). Subsequently, Test 113 is used to determine whether the overload is improving, steady, or getting worse. If the result of Test 113 is that there has been a sharp improvement, then a message 122 is sent to re-set timers. If the overload is improving modestly, then messages are sent to reduce the interval, (Action Block 124). If the overload is steady, then messages are sent to maintain the interval, (Action Block 126). If the overload is getting worse, then messages are sent to the served MSCs to add to the services being code gapped, and/or to increase the code gapping interval, (Action Block 128).

Figure 3:
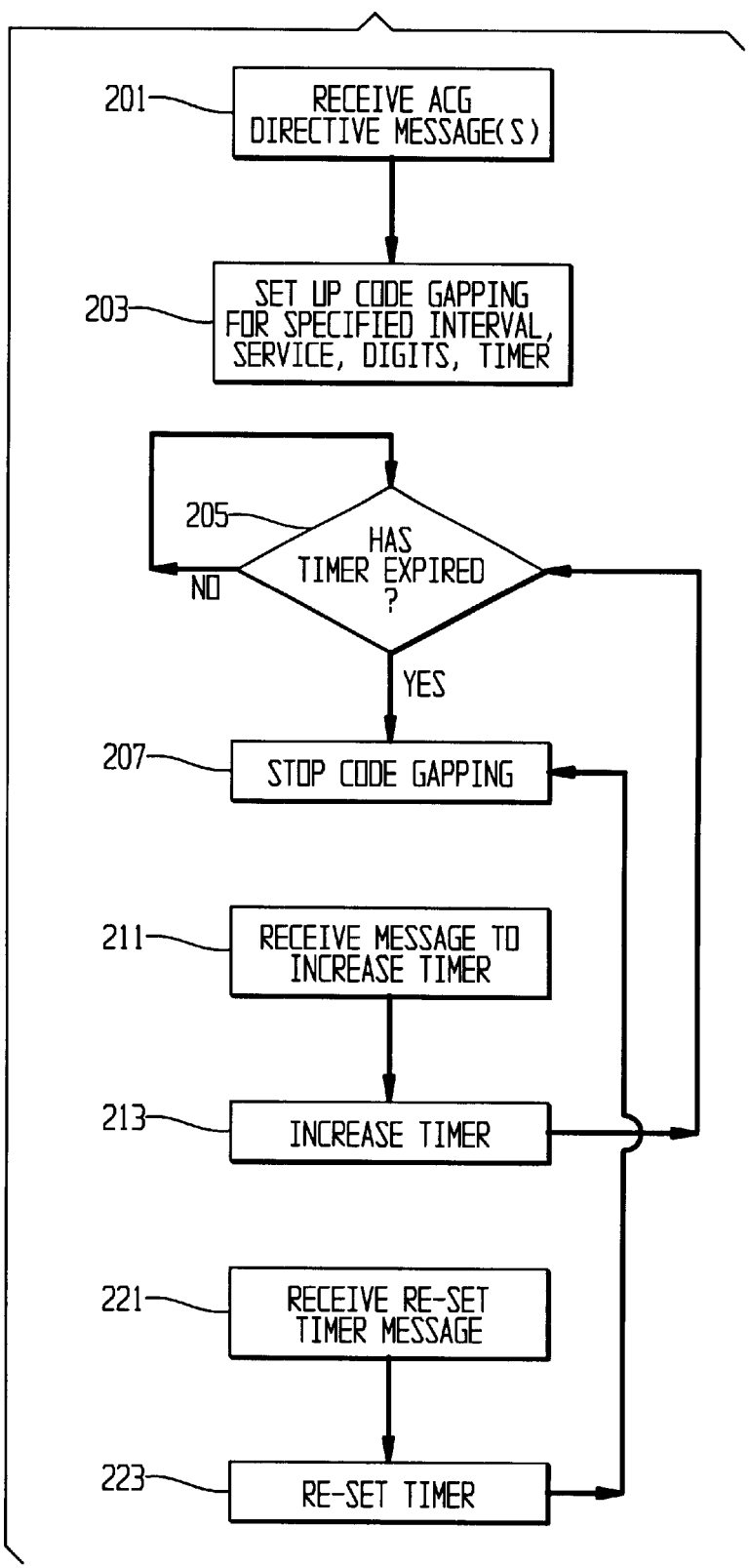
FIG. 3 is a Flow Diagram illustrating actions performed at an MSC in response to a request for code gapping.

FIG. 3 is a Flow Diagram indicating the response of an MSC to a code gapping request message. The message is received, (Action Block 201). Code gapping control is set up for the specified interval, service, and digits, (Action Block 203). Subsequently, the appropriate types of messages are subject to code gapping. The timer for code gapping is also set. Subsequently, Test 205 is used to determine if the timer has expired. If not, more time is allowed to lapse, and Test 205 is re-entered. If Test 205 indicates that the timer has expired, then code gapping is stopped, (Action Block 207). If a message, (Action Block 122, FIG. 2), is received to increase the timer, (Action Block 211), then the value of the timer is increased, and after an interval, Test 205 is re-entered as previously described. If a message, (Action Block 128, FIG. 2), is received to re-set the timer, (Action Block 221), then the timer is re-set, (Action Block 223), and code gapping is stopped (Action Block 207). The response, (not shown), to the reduce interval, (Action Block 124), and maintain interval, (Action Block 126), is to reduce or maintain the timer interval.

The above is one preferred embodiment of Applicants' invention. Numerous variations on this embodiment will be apparent to those of ordinary skill in the art. The Application is only limited by the attached Claims.

What is claimed is:

1. In a switching control point, (SCP), a method of implementing code gapping of call control messages, comprising the step of:

in said SCP, generating a code gapping control message consisting only of code gapping control information; and transmitting said code gapping control message to each of a plurality of switches served by said SCP.

2. The method of claim 1, wherein each of said plurality of switches is a mobile switching center.

3. The method of claim 1, wherein one type of said code gapping control message is a message for control gapping all types of messages subject to code gapping control.

4. The method of claim 1, wherein one type of said code gapping control message controls code gapping for a plurality of types of messages.

5. In a switching control point, (SCP), apparatus for controlling code gapping of call control messages from a plurality of switches served by said SCP, comprising:

means for transmitting data messages to each of said plurality of switches; and control means, operative under the control of a program for:

generating code gapping control messages consisting only of code gapping control information; and controlling transmission of said code gapping control messages to ones of said plurality of switches served by said SCP.

6. The apparatus of claim 5, wherein each of said plurality of switches is a mobile switching center.

7. The apparatus of claim 5, wherein the generating of code gapping control messages comprises generating code gapping control messages, each for controlling code gapping of all types of messages subject to call gapping control in one of said switches.

8. The apparatus of claim 5, wherein the generating of code gapping control messages comprises generating code gapping control messages, each for controlling code gapping of a plurality of messages subject to call gapping control in one of said switches.

* * * * *